(12) United States Patent
Park et al.

(10) Patent No.: US 10,033,255 B2
(45) Date of Patent: Jul. 24, 2018

(54) DRIVING MOTOR (71) Applicants: HYUNDAI MOTOR COMPANY, Seoul (KR); KIA Motors Corporation, Seoul (KR)

(72) Inventors: Sangjin Park, Hwaseong-si (KR); WoongChan Chae, Gwangmyeong-si (KR); Jungwoo Lee, Hwaseong-si (KR)

(73) Assignees: Hyundai Motor Company (KR); KIA Motors Corporation (KR)

( * ) Notice: Subject to any disclaimer, the term of this patent is extended or adjusted under 35 U.S.C. 154(b) by 0 days.

(21) Appl. No.: 15/622,538

(22) Filed: Jun. 14, 2017

(65) Prior Publication Data

US 2018/0109170 A1   Apr. 19, 2018

(30) Foreign Application Priority Data

Oct. 17, 2016 (KR) .................. 10-2016-0134609

(51) Int. Cl.
*H02P 1/46* (2006.01)
*H02K 17/26* (2006.01)
(Continued)

(52) U.S. Cl.
CPC .............. *H02K 17/26* (2013.01); *H02K 1/26* (2013.01); *H02K 3/487* (2013.01); *H02K 19/14* (2013.01); *H02P 25/02* (2013.01); *H02P 29/00* (2013.01)

(58) Field of Classification Search
CPC .. H02K 7/00; H02K 1/24; H02K 1/14; H02K 29/03; H02P 6/00; H02P 6/14; H02P 7/00; H02P 25/30; H02P 25/00; H02P 1/24; H02P 1/42; H02P 3/18; H02P 23/00; H02P 27/00; H02P 1/46; H02P 19/02; H02P 19/00; H03K 3/00

USPC ............ 310/156.19, 166, 216.063, 216.114, 310/102 R, 146, 61, 49.39, 59, 214; 318/700, 400.01, 400.41, 720, 725, 727, 318/824, 825, 244, 254.1, 515, 538
See application file for complete search history.

(56) References Cited

U.S. PATENT DOCUMENTS 4,293,787 A * 10/1981 Ito .................. H02K 3/493
                                                    310/181
6,933,646 B2 * 8/2005 Kinoshita .......... H02K 1/145
                                                    310/179

FOREIGN PATENT DOCUMENTS

| CN | 103532269 A | 1/2014 |
| JP | 54-058805 A | 5/1979 |
| KR | 10-2016-0066841 A | 6/2016 |

* cited by examiner

*Primary Examiner* — Antony M Paul
(74) *Attorney, Agent, or Firm* — McDonnell Boehnen Hulbert & Berghoff LLP (57) ABSTRACT

A driving motor includes a rotor body that is rotatably installed inside a stator with a predetermined void therebetween and has a rotor coil wound on multiple rotator teeth. The rotor body includes: i) multiple wedges inserted between the rotor teeth of the rotor body in an axial direction and supporting the rotor coil; and ii) end coil covers mounted on both axial ends of the rotor body, respectively and connected with the wedge members. Each wedge member includes a wedge body disposed between the rotor teeth in the axial direction and connected with the end coil covers. Each wedge body is made of a metallic material having a conductivity and has an insulating layer formed on an outer surface other than both cross sections connected to the end coil covers. The end coil covers are also made of a metallic material having a conductivity and are connected with the ends of each wedge body.

17 Claims, 10 Drawing Sheets

(51) Int. Cl.
*H02K 1/26* (2006.01)
*H02K 19/14* (2006.01)
*H02K 3/487* (2006.01)
*H02P 25/02* (2016.01)
*H02P 29/00* (2016.01)

DRIVING MOTOR

CROSS-REFERENCE TO RELATED APPLICATION

This application claims priority to and the benefit of Korean Patent Application No. 10-2016-0134609 filed in the Korean Intellectual Property Office on Oct. 17, 2016, the entire contents of which are incorporated herein by reference.

BACKGROUND

(a) Technical Field

The present disclosure relates to a driving motor, and more particularly, to a driving motor which is drivable as a wound rotor synchronous motor and an induction motor.

(b) Description of the Related Art

In general, a hybrid vehicle or an electric vehicle, also known as an environmentally-friendly vehicle, can generate drive force by an electric motor (hereinafter, referred to as a "driving motor") obtaining rotary force from electric energy.

For example, the hybrid vehicle is driven in an electric vehicle (EV) mode or a hybrid electric vehicle (HEV) mode. An EV mode is a pure electric vehicle mode using only the power of the driving motor. A HEV mode uses both the rotary force of an engine and the rotary force of the driving motor as the power. In addition, a general electric vehicle is driven by using the rotary force of the driving motor as the power.

As described above, when the driving motor is used as a power source of the environmentally-friendly vehicle, a permanent magnet synchronous motor (PMSM) is mostly used. In order for the PMSM to show the maximum performance under a limited layout condition, the performance of a permanent magnet needs to be maximized.

A neodymium (Nd) component of the permanent magnet enhances the intensity of the permanent magnet and a dysprosium (Dy) component enhances high-temperature demagnetization resistance. The rare-earth (Nd and Dy) metals used in such components of the permanent magnet naturally occur in only a few countries, including China. Due to the difficulty in mining these metals, they are very expensive and experience significant price fluctuation.

In order to solve this problem, in recent years, application of an induction motor has been considered. However, the volume and weight of an induction motor that would be needed to achieve the same motor performance is excessive.

Meanwhile, in recent years during which driving motors have been used as the power source of environmentally-friendly vehicles, development of a wound rotor synchronous motor (WRSM) that can substitute for the PMSM has progressed.

A rotor is electromagnetized at the time of applying current by winding coils on the rotor as well as a stator. As a result, the wound rotor synchronous motor (WRSM) can be substituted for the permanent magnet of the permanent magnet synchronous motor (PMSM).

In the wound rotor synchronous motor (WRSM), the rotor is disposed inside the stator with a predetermined void. When power is applied to the coils of the stator and the rotor, a magnetic field is formed and the rotor rotates by a magnetic action generated therebetween.

Further, in the wound rotor synchronous motor (WRSM), since the coils are wound on the rotor, unlike in the permanent magnet synchronous motor (PMSM), the rotor coils may be removed by the action of the centrifugal force that results when the rotor rapidly rotates (generally, at a maximum of 10,000 rpm or more in the case of the EV).

In order to prevent the problem, in the related art, end coil covers are mounted on both ends of the rotor and a resin is molded in the end coil covers to fix the rotor coils.

Meanwhile, in the wound rotor synchronous motor (WRSM), copper loss occurs due to the resistance of the rotor coils. As a result, heat generation of the rotor coils may be caused and performance of the motor may deteriorate. In particular, in the wound rotor synchronous motor (WRSM), there is a high possibility that the cooling performance of the motor will deteriorate as the resin is molded in the end coil covers.

Furthermore, where the wound rotor synchronous motor (WRSM) is used by the electric vehicle, when abrupt malfunction such as a short-circuit of the rotor coils or an insulation defect of the rotor coils occurs, a disorder is caused in the winding current and the generated torque, thereby bringing about an inoperable state of the vehicle.

When the vehicle is in the inoperable state due to the abrupt malfunction of the rotor while the vehicle is being driven, there is a possibility that a dangerous situation will develop for the driver depending upon the location of the vehicle.

The above information disclosed in this Background section is only for enhancement of understanding of the background of the disclosure and therefore it may contain information that does not form the prior art.

SUMMARY OF THE DISCLOSURE

The present disclosure has been made to provide a driving motor which can generate the driving force needed to enable temporary driving of a vehicle when a rotor malfunctions.

Further, the present disclosure has been made to provide a driving motor which can efficiently emit heat generated from rotor coils through flow of external air using a non-molding type open structure without molding a resin in the end coil cover.

An exemplary embodiment of the present disclosure provides a driving motor including a rotor body which is rotatably installed inside a stator with a predetermined void and has a rotor coil wound on multiple rotator teeth. The rotor body further includes: i) multiple wedge members inserted between the rotor teeth of the rotor body in an axial direction and supporting the rotor coil; and ii) end coil covers mounted on both axial ends of the rotor body, respectively and connected with the wedge members. Each wedge member includes a wedge body disposed between adjacent rotor teeth in the axial direction and connected with the end coil covers. The wedge body is made of a metallic material having conductivity and has an insulating layer formed on an outer surface other than both cross sections connected to the end coil covers. The end coil covers are also made of a metallic material having conductivity and are connected with both ends of the wedge body.

The driving motor may be driven as an induction motor by the wedge members and the end coil covers when the rotor malfunctions.

The wedge body of each wedge member may be provided as a conductor bar inserted into the rotor body and the end coil cover may be provided as an end ring connected with the wedge body.

Both ends of a wedge body may be bonded to the end coil covers.

Both ends of a wedge body may be coupled to the end coil covers by a male-female method.

Both ends of a wedge body may be coupled to fitting grooves provided in the end coil covers. The fitting grooves may be formed on a fitting protrusion which protrudes from the end coil covers in a shape corresponding to a cross section of the wedge body.

Each wedge body may be made of any of the following conductive metallic materials: iron, copper, and aluminum.

Another exemplary embodiment of the present disclosure provides a driving motor including a rotor body which is rotatably installed inside a stator with a predetermined void and has a rotor coil wound on multiple rotator teeth. The rotor body further includes: i) a bobbin disposed at each of the axial ends of the rotor body, supporting the rotor coil, and fixed to the rotor body by the rotor coil; ii) multiple wedge members which are inserted between the rotor teeth of the rotor body in an axial direction, protrude to the outside of both axial ends of the rotor body, and support the rotor coil; and iii) end coil covers mounted on both axial ends of the rotor body, connected with the portions of the wedge members that protrude, and mounted on the bobbins. Each wedge member includes a wedge body disposed between the rotor teeth in the axial direction and connected with the end coil covers. Each wedge body is made of a metallic material having conductivity and has an insulating layer formed on an outer surface other than both cross sections connected to the end coil covers. The bobbin has a plurality of first connection passages that extend along the axial direction of the rotor body. The end coil covers are made of a metallic material having conductivity and have at least one second connection passage connected with the first connection passages.

The rotor may have a non-molding type open structure by the bobbin and the end coil covers.

First and second connection passages may be connected with a space between the rotor teeth on which the rotor coil is wound in the rotor body.

The bobbins may include a plurality of coil supports supporting the rotor teeth and radially partitioning the plurality of first connection passages.

The end coil covers may include a plurality of ribs radially partitioning the second connection passages.

The portions of the wedge members that protrude may penetrate the first connection passages of the bobbins and may be connected to the second connection passages of the end coil covers.

Each wedge body may have a hollow area formed in the axial direction of the rotor body, and both ends of the wedge body may be connected to exteriors of the second connection passages among the ribs.

The second connection passages may be connected with the hollow areas of the wedge body.

Yet another exemplary embodiment of the present disclosure provides a method for controlling a driving motor, which includes a stator on which a stator coil is wound and a rotor on which a rotor coil is wound while being spaced apart from the stator with a predetermined void. The method includes: applying current to the stator coil and the rotor coil and diagnosing a malfunction of the rotor; driving the driving motor as a wound rotor synchronous motor when it is determined that the rotor has not malfunctioned; and blocking current applied to the rotor coil and driving the driving motor as an induction motor through the wedge members of the rotor and end coil covers, when it is determined that the rotor has malfunctioned.

In diagnosing the malfunctioning of the rotor, a short-circuit and an insulation defect of the rotor coil may be sensed.

The driving motor may be driven as a wound rotor synchronous motor during normal times and driven as an induction motor when the rotor malfunctions.

Accordingly, according to exemplary embodiments of the present disclosure, when an abrupt malfunction such as a short-circuit in the rotor coils or an insulation defect of the rotor coils occurs, a driving motor can be temporarily driven as an induction motor. As a result, a vehicle is driven to a safe place by driving force and a driver can get out of a dangerous situation.

Further, according to the exemplary embodiments of the present disclosure, cooling performance of the rotor coils can be maximized through heat transfer characteristics of the wedge members. Flow of air and efficiency of a motor can be further enhanced as a non-molding type open rotor structure without molding a resin in the end coil cover.

BRIEF DESCRIPTION OF THE DRAWINGS

The drawings are used for reference in describing exemplary embodiments of the present disclosure and thus, the technical spirit of the present disclosure should not be understood to be limited to the accompanying drawings.

DETAILED DESCRIPTION

Hereinafter, the present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure.

The drawings and description are to be regarded as illustrative in nature and not restrictive and like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In the following description, the names of components are referred to as first, second and the like because the names of the components are the same as each other and the order thereof is not particularly limited.

Throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

Figure 1:
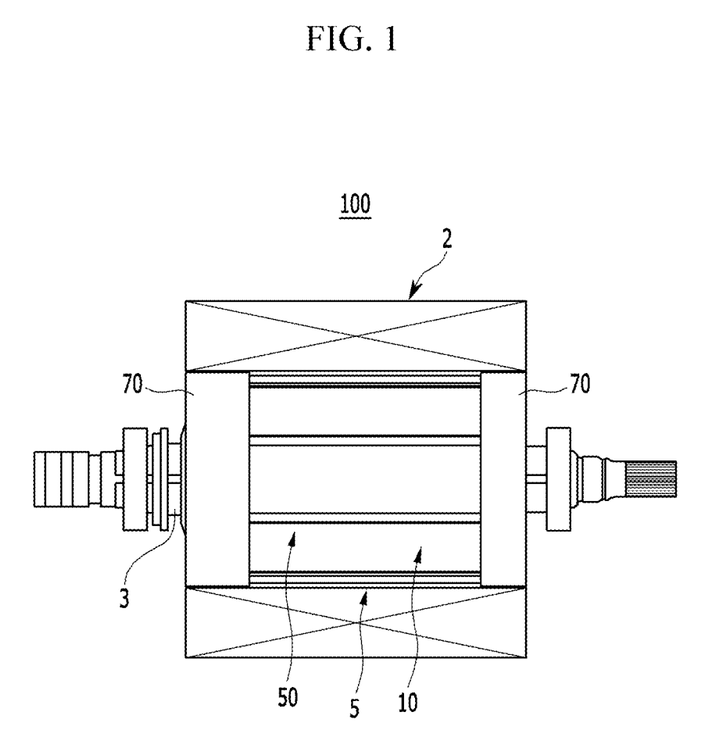
FIG. 1 is a diagram schematically illustrating a driving motor according to an exemplary embodiment of the present disclosure.

FIG. 1 is a diagram schematically illustrating a driving motor according to an exemplary embodiment of the present disclosure.

Referring to FIG. 1, the driving motor 100 according to the exemplary embodiment of the present disclosure may be applied to an electric apparatus which obtains driving force as electric energy in an environmentally friendly vehicle.

For example, the driving motor 100 may be configured as a wound rotor synchronous motor including a stator 2 on which a stator coil (not illustrated) is wound and a rotor 5 wound with a rotor coil 1 and disposed inside the stator 2.

A rotary shaft 3 is coupled to and extends through the center of the rotor 5. An outer diameter surface of the rotor 5 is disposed inside the stator 2 and spaced apart from an inner diameter surface of the stator 2 with a predetermined void.

Accordingly, in the driving motor 100, the rotor coil 1 is wound on the rotor 5, as is the stator 2, to electromagnetize the rotor 5 at the time of applying current and generate driving torque by the attractive and repulsive forces of electromagnetism between an electromagnet of the rotor 5 and the electromagnet of the stator 2.

When the driving motor 100 according to the exemplary embodiment of the present disclosure is adopted by an electric vehicle, the driving motor 100 may generate the driving force needed to enable a vehicle to be driven when the rotor 5 malfunctions. That is, the exemplary embodiment of the present disclosure provides the driving motor 100 which may be temporarily driven as an induction motor when the rotor 5 malfunctions.

Figure 2:
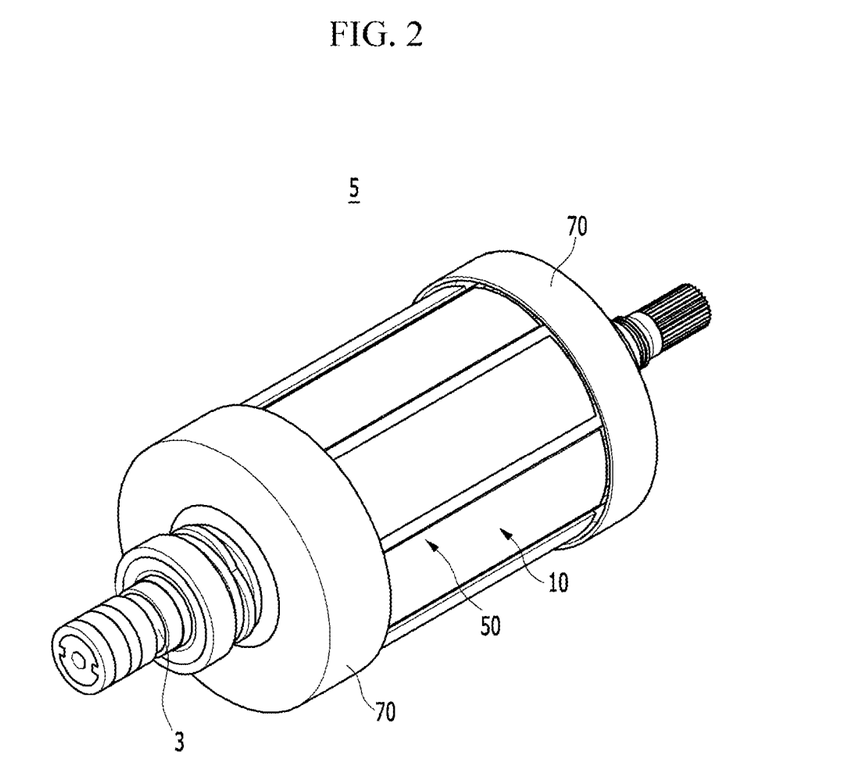
FIG. 2 is a perspective view illustrating a rotor applied to the driving motor according to the exemplary embodiment of the present disclosure.
Figure 3:
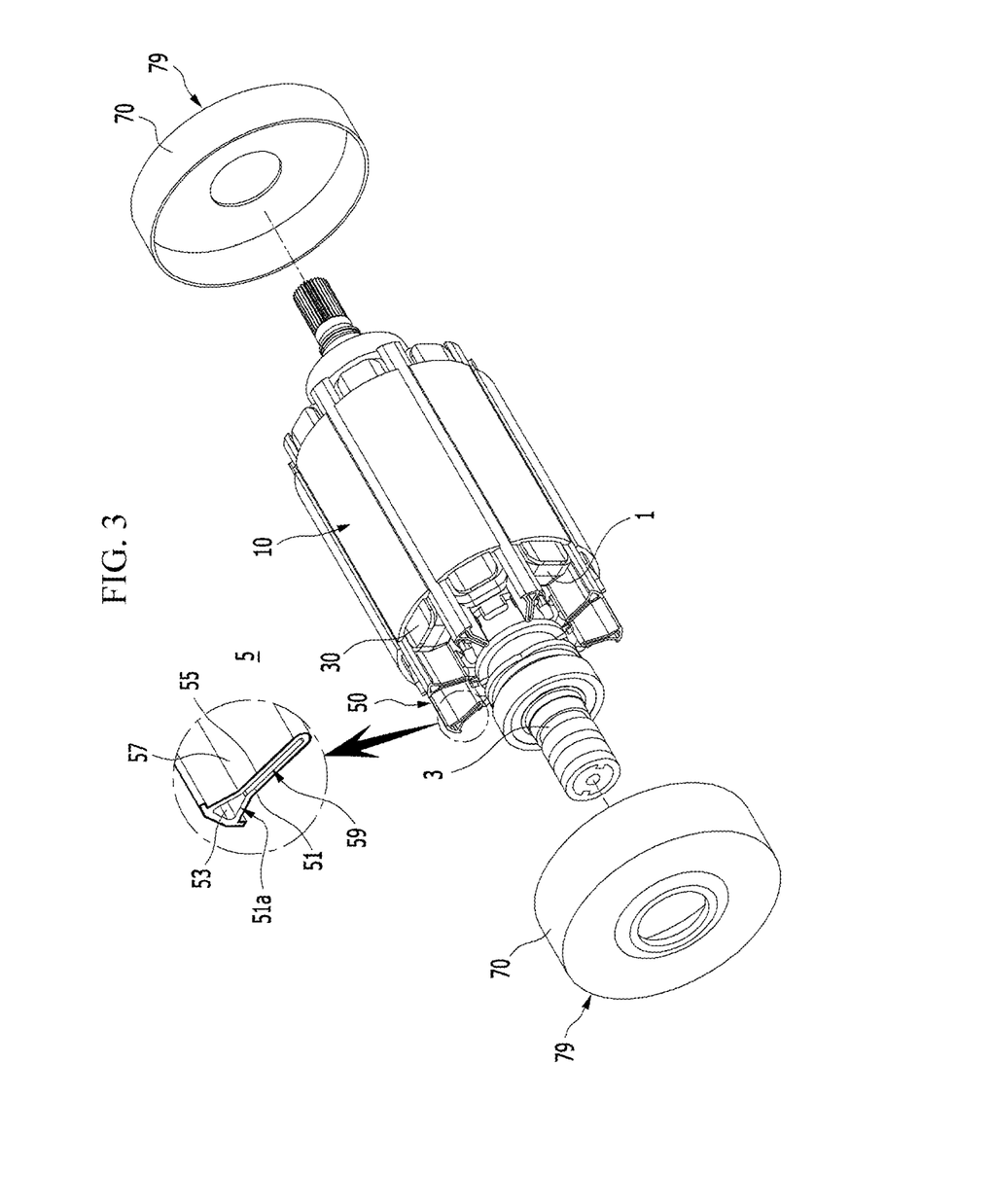
FIG. 3 is a partially exploded perspective view illustrating the rotor applied to the driving motor according to the exemplary embodiment of the present disclosure.
Figure 4:
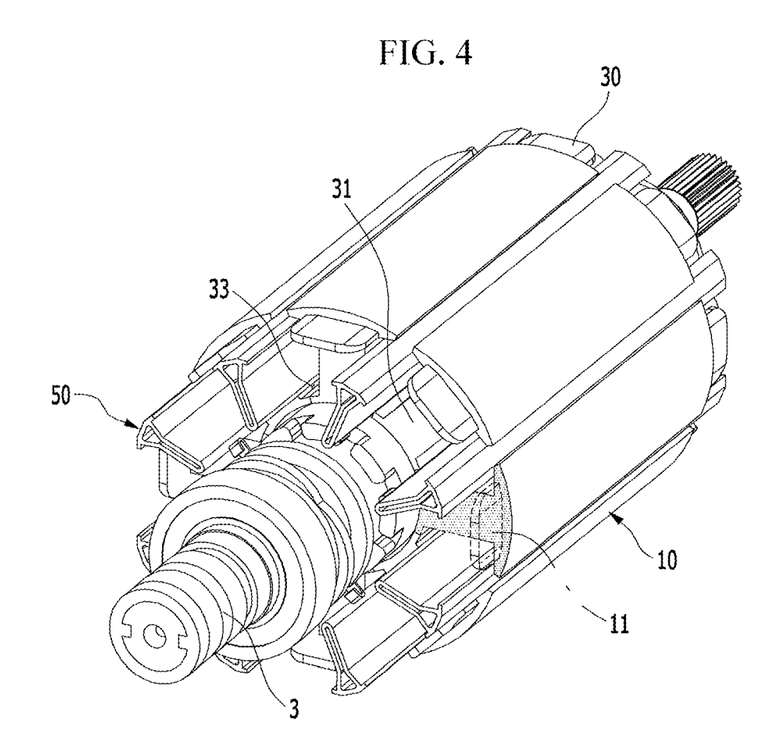
FIG. 4 is a perspective view illustrating a coupling structure of a bobbin and a wedge member of the rotor if the rotor coil is not wounded according to the exemplary embodiment of the present disclosure.

FIG. 2 is a perspective view illustrating a rotor 5 applied to the driving motor. FIG. 3 is a partially exploded perspective view illustrating the rotor 5 applied to the driving motor. FIG. 4 is a perspective view illustrating a coupling structure of a bobbin and a wedge member of the rotor if the rotor coil is not wounded according to the exemplary embodiment of the present disclosure.

Referring to FIGS. 1 to 4, in the driving motor 100 according to the exemplary embodiment of the present disclosure, the rotor 5 includes a rotor body 10, a bobbin 30, a number of wedge members 50, and two end coil covers 70.

The rotor body 10 is provided as a rotor core in which multiple steel plates are stacked and is rotatably installed inside the stator 2 with a predetermined void therebetween. The rotary shaft 3 is coupled to and extends through the center of the rotor body 10.

The rotor body 10 may be fixed to the rotary shaft 3 at the center in an axial direction through a retainer. Since the retainer is prior art which is widely known in the art, more detailed description of the retainer will be omitted in the present specification.

The rotor body 10 includes multiple rotor teeth 11 (hereinafter, see FIG. 6) on which the rotor coil 1 is wound. The rotor teeth 11 extend in a radial direction of the rotor body 10 and are disposed to be spaced apart from each other at a predetermined interval in a circumferential direction of the rotor body 10. A slot 13 (hereinafter, see FIG. 6) for winding the rotor coil 1 on the rotor teeth 11 is formed between the rotor teeth 11.

In addition, the rotor body 10 includes a number of rotor shoes 15 (hereinafter, see FIG. 6) which protrude from the rotor teeth 11 facing an inner diameter surface of the stator 2 in the circumferential direction and have a curved outer diameter surface facing the inner diameter surface of the stator 2.

Figure 6:
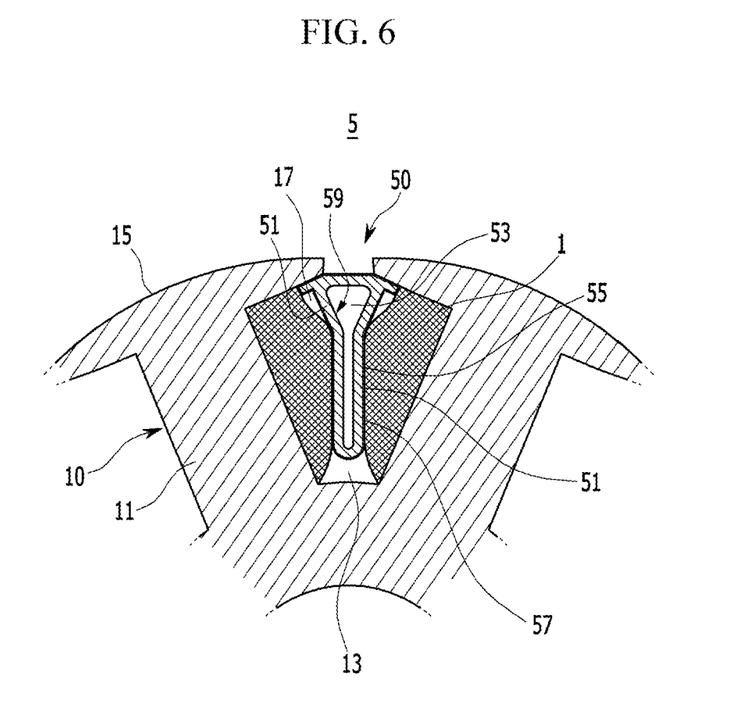
FIG. 6 is a diagram illustrating a coupling structure of the wedge member of the rotor applied to the driving motor according to the exemplary embodiment of the present disclosure.

Herein, the rotor shoe 15 is disposed to be spaced apart from an adjacent rotor shoe 15 at a predetermined interval along the entire length of the shoe.

In the exemplary embodiment of the present disclosure, the bobbin 30 is used for supporting the rotor coil 1 wound on the rotor teeth 11 of the rotor body 10. The bobbin 30 may prevent the rotor coil 1 from being removed from the rotor teeth 11 by centrifugal force when the rotor body 10 rapidly rotates (in general, a maximum of 10,000 rpm or more in the case of an EV).

Herein, the bobbin 30 is made of an insulating material such as a synthetic resin and is disposed at each axial end of the rotor body 10. The bobbin 30 may support the rotor coil 1 wound on the rotor teeth 11 and be fixed to the rotor body 10 by the rotor coil 1.

Figure 5:
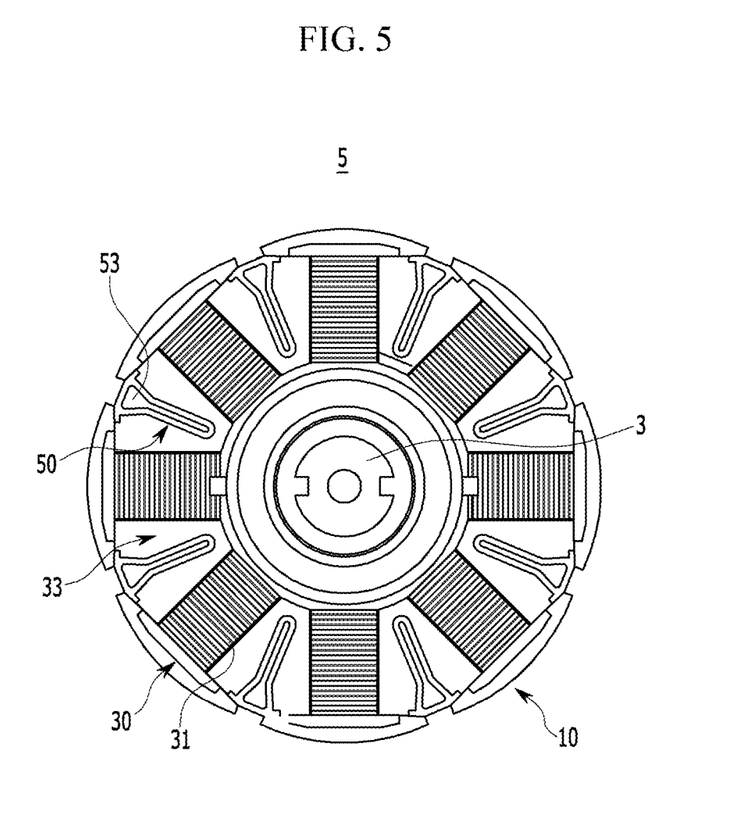
FIG. 5 is a diagram illustrating a bobbin and a wedge member of the rotor applied to the driving motor according to the exemplary embodiment of the present disclosure.

FIG. 5 is a diagram illustrating a bobbin and a wedge member of the rotor applied to the driving motor according to the exemplary embodiment of the present disclosure.

Referring to FIG. 5, in the exemplary embodiment of the present disclosure, the bobbin 30 has a plurality of coil supports 31 for supporting the rotor coil 1 with the rotor teeth 11 interposed between both ends of the rotor body 10.

The coil supports 31 support the rotor teeth 11 at both axial ends of the rotor body 10 and support the rotor coil 1 wound on the rotor teeth 11. The coil supports 31 are disposed to be spaced apart in the radial direction toward the center at a predetermined interval to correspond to the rotor teeth 11.

FIG. 6 is a diagram illustrating a wedge member coupling structure of the rotor applied to the driving motor according to the exemplary embodiment of the present disclosure.

Referring to FIGS. 5 and 6 together with FIGS. 3 and 4, the wedge member 50 supports the rotor coil 1 wound on the rotor teeth 11 and is installed in a slot 13 between the rotor teeth 11.

The wedge member 50 is used for supporting the centrifugal force applied to the rotor coil 1, securing alignment of the rotor coil 1 and securing insulation between the rotor coils 1 having different phases in the slot 13 when the rotor body 10 rapidly rotates.

The wedge member 50 is inserted into the slot 13 between the rotor teeth 11 in the axial direction and supports the rotor coil 1 and both ends of the rotor shoe 15 mentioned above. In addition, the wedge member 50 partially protrudes and extends past both ends of the rotor body 10 while being coupled to the slot 13 between the rotor teeth 11.

The wedge member 50 includes a wedge body 51 disposed between the rotor teeth 11 in the axial direction. The wedge body 51 has a hollow area 53 defined along the axial direction of the rotor body 10. The wedge body 51 has a triangular cross section shape which is elastically transformable and has both surfaces 57 supporting the rotor coil 1 in the slot 13. In the above description, the hollow area 53 is formed inside both surfaces of the wedge body 51 in the axial direction.

In the exemplary embodiment of the present disclosure, the wedge body 51 is made of a metallic material having electrical conductivity and thermal conductivity. For example, the wedge body 51 may be made of any one of the conductive metallic materials in the following group: iron, copper, and aluminum.

In addition, the wedge body 51 has an insulating layer 55 made of an insulation material on an outer surface other than both cross sections 51a connected to the end coil covers 70 in order to secure insulation between the rotor coils 1 having different phases in the slot 13 between the rotor teeth 11.

In the exemplary embodiment of the present disclosure, as illustrated in FIGS. 2 and 3, the end coil covers 70 are used for preventing the rotor coil 1 from being removed from the rotor teeth 11 by the centrifugal force when the rotor body 10 rapidly rotates (in general, a maximum of 10,000 rpm or more in the case of the EV).

An end coil cover 70 is mounted at each axial end of the rotor body 10. As a result, the end coil cover 70 may be fixedly coupled to the bobbin 30 while covering the portions of the wedge members 50 that protrude. The end coil cover 70 is made of the metallic material having the electrical conductivity and the thermal conductivity such as the wedge body 51 and is connected with an end of the wedge body 51.

Figure 7:
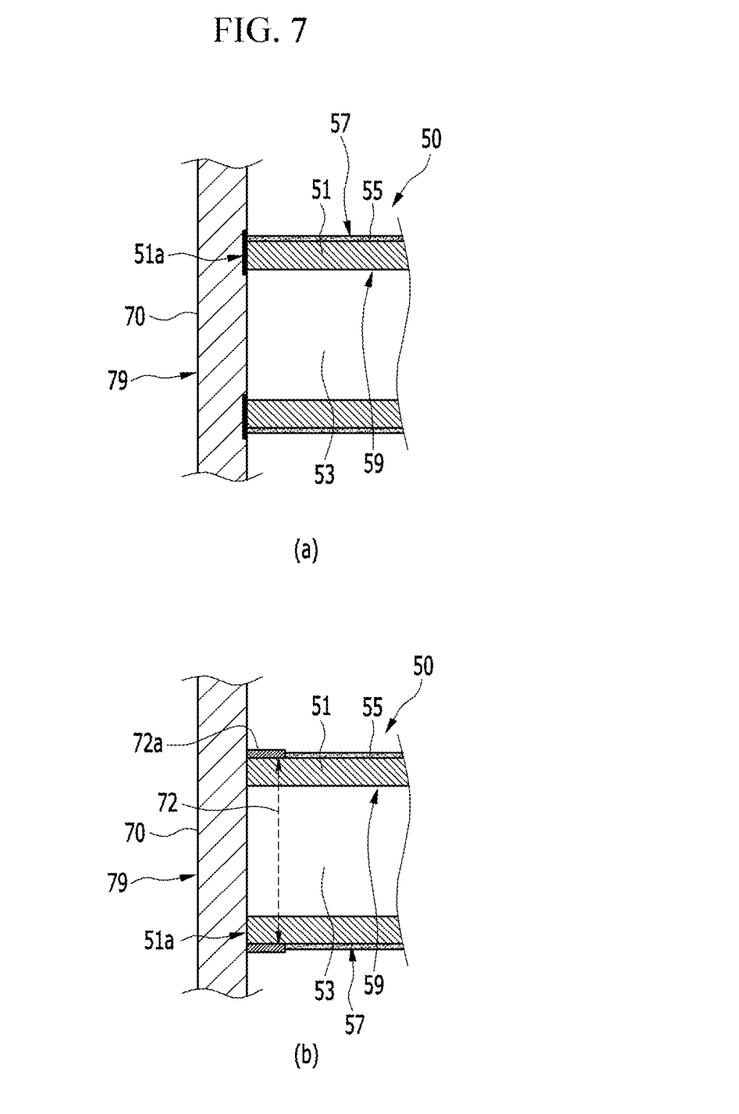
FIG. 7 is a diagram illustrating a coupling structure of the wedge member and an end coil cover in the rotor applied to the driving motor according to the exemplary embodiment of the present disclosure.

Herein, both ends of the wedge body 51 may be coupled to an inner surface of the end coil cover 70 by a welding method as illustrated in FIG. 7A. Alternately, both ends of the wedge body 51 may be coupled to the inner surface of the end coil cover 70 by a male-female method as illustrated in FIG. 7B.

In the case of the coupling method of FIG. 7B, both ends of the wedge body 51 may be coupled to a fitting groove 72 provided on the inner surface of the end coil cover 70 by a forcible fitting method. For example, the fitting groove 72 having a shape corresponding to a cross section of the wedge body 51 is formed at a fitting protrusion 72a which protrudes on the inner surface of the end coil cover 70 and coupled with both ends of the wedge body 51 by the male-female method.

Hereinafter, the operation and a control method of the driving motor 100, according to the exemplary embodiment of the present disclosure, will be described in detail with reference to the disclosed drawings.

Figure 8:
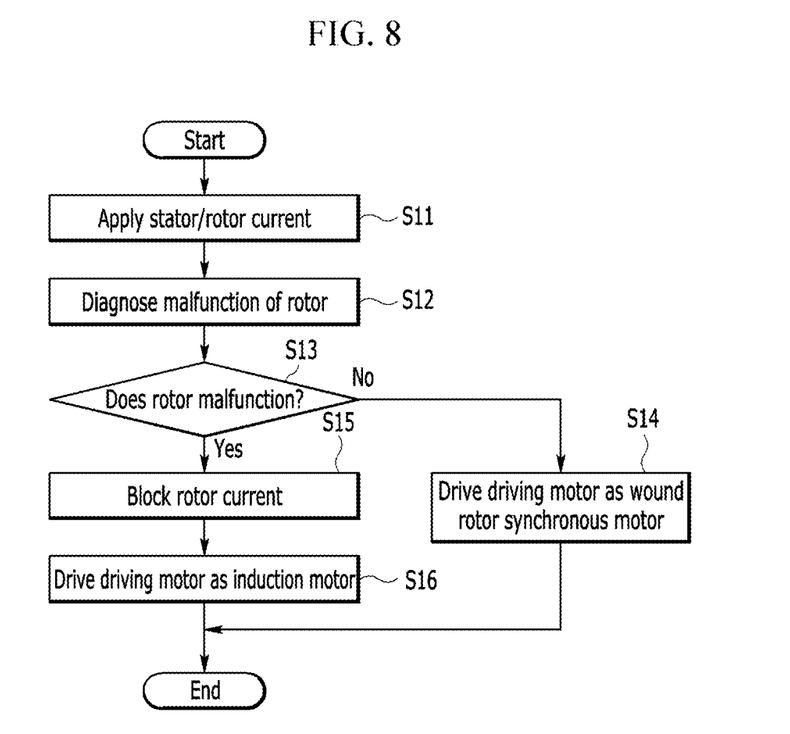
FIG. 8 is a flowchart for a method of controlling a driving motor according to an exemplary embodiment of the present disclosure.

FIG. 8 is a flowchart for describing a method of controlling a driving motor according to an exemplary embodiment of the present disclosure.

First, at step S11, current is applied to a stator coil of the stator 2 and the rotor coil 1 of the rotor body 10.

Then, at step S12, a malfunction of the rotor 5 is diagnosed. For example, in the exemplary embodiment of the present disclosure, if a short-circuit or an insulation defect of the rotor coil 1 is sensed, then the malfunction of the rotor 5 may be diagnosed.

Since the malfunction diagnosis of the rotor 5 that senses the short-circuit and the insulation defect of the rotor coil 1 by measuring electric resistance is known, more detailed description thereof will be omitted in the present specification.

At step S13, it is determined whether the rotor 5 has malfunctioned. When it is determined that the rotor 5 has not malfunctioned, the current is applied to the stator coil of the stator 2 and the rotor coil 1 of the rotor 5. This allows the driving motor, at step S14, to be driven as the wound rotor synchronous motor where the rotor body 10 rotates by a magnetic action generated between the stator 2 and the rotor body 10. At step S14, the driving motor may be driven as a wound rotor synchronous motor that electromagnetizes the rotor 5 and generates the driving torque by the attractive force and the repulsive force of the electromagnetism between the electromagnet of the rotor 5 and the electromagnet of the stator 2.

If, at step S13, it is determined that the rotor 5 has malfunctioned, the current applied to the rotor coil 1 is blocked at step S15. Accordingly, once the current applied to the rotor coil 1 is blocked to control the driving motor, at step S16, the driving motor is driven as the induction motor by the wedge members 50 of the rotor 5 and the end coil covers 70.

In this case, each wedge body 51 of the wedge member 50 is provided with a conductor bar 59 of the induction motor and the end coil cover 70 is provided with an end ring 79 of the induction motor.

In the above description, the induction motor is a kind of an AC motor and is operated by rotary force generated by an interaction with a rotary magnetic field generated by alternate current which flows on the coil of the stator 2 and induction current generated by the rotor 5.

When the driving motor 100 is driven as the induction motor according to the exemplary embodiment of the present disclosure, when the AC current is applied to the coil of the stator 2, the induction current is generated in the rotor 5 by the rotary magnetic field of the stator 2. The rotary force to rotate in one direction is applied to the rotor 5 by the rotary magnetic field of the stator 2 and the induction current of the rotor 5.

That is, in the rotor 5 of the driving motor 100 according to the exemplary embodiment of the present disclosure, which is driven as the induction motor, the induction current is generated in the wedge body 51 for performing a function of the conductor bar 59 and the end coil cover 70 for performing a function of the end ring 79 by the rotary magnetic field of the stator 2.

Accordingly, the driving motor 100 may be driven as a wound rotor synchronous motor in normal times and as an induction motor when the rotor 5 malfunctions.

As a result, when abrupt malfunction such as a short-circuit of the rotor coil 1 or an insulation defect of the rotor coil 1 occurs, the driving motor can temporarily be driven as an induction motor. As a result, a vehicle may be driven to a safe place by driving force (in the art, referred to as a "limphome mode") and a driver can be removed from a dangerous situation.

Figure 9:
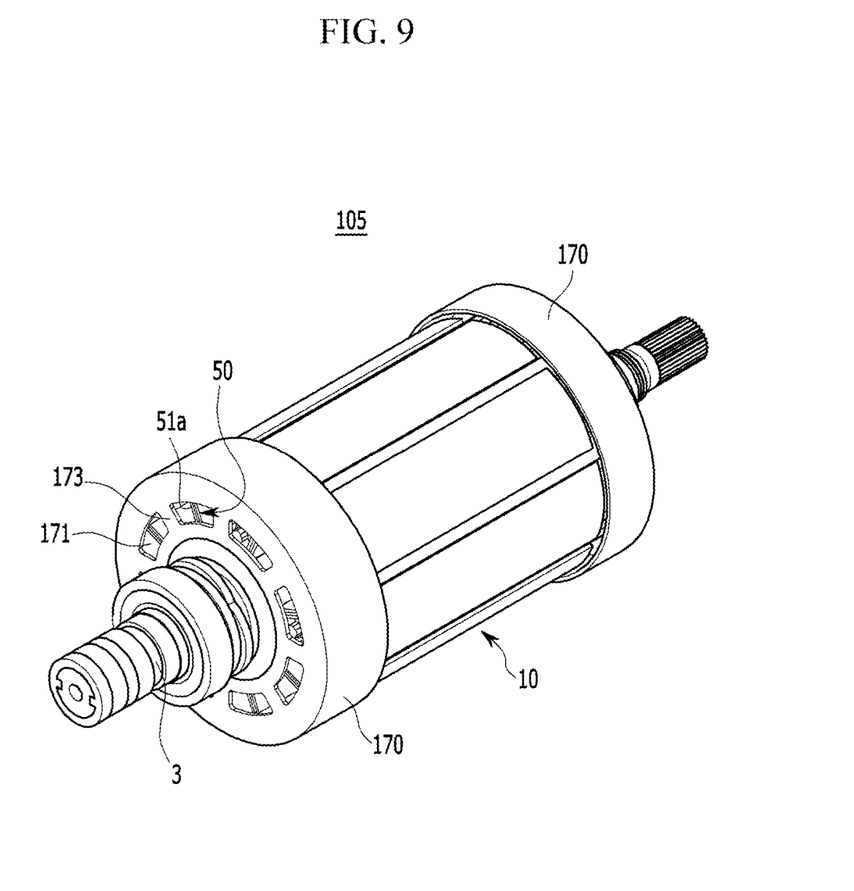
FIG. 9 is a perspective view illustrating a rotor of a driving motor according to another exemplary embodiment of the present disclosure.
Figure 10:
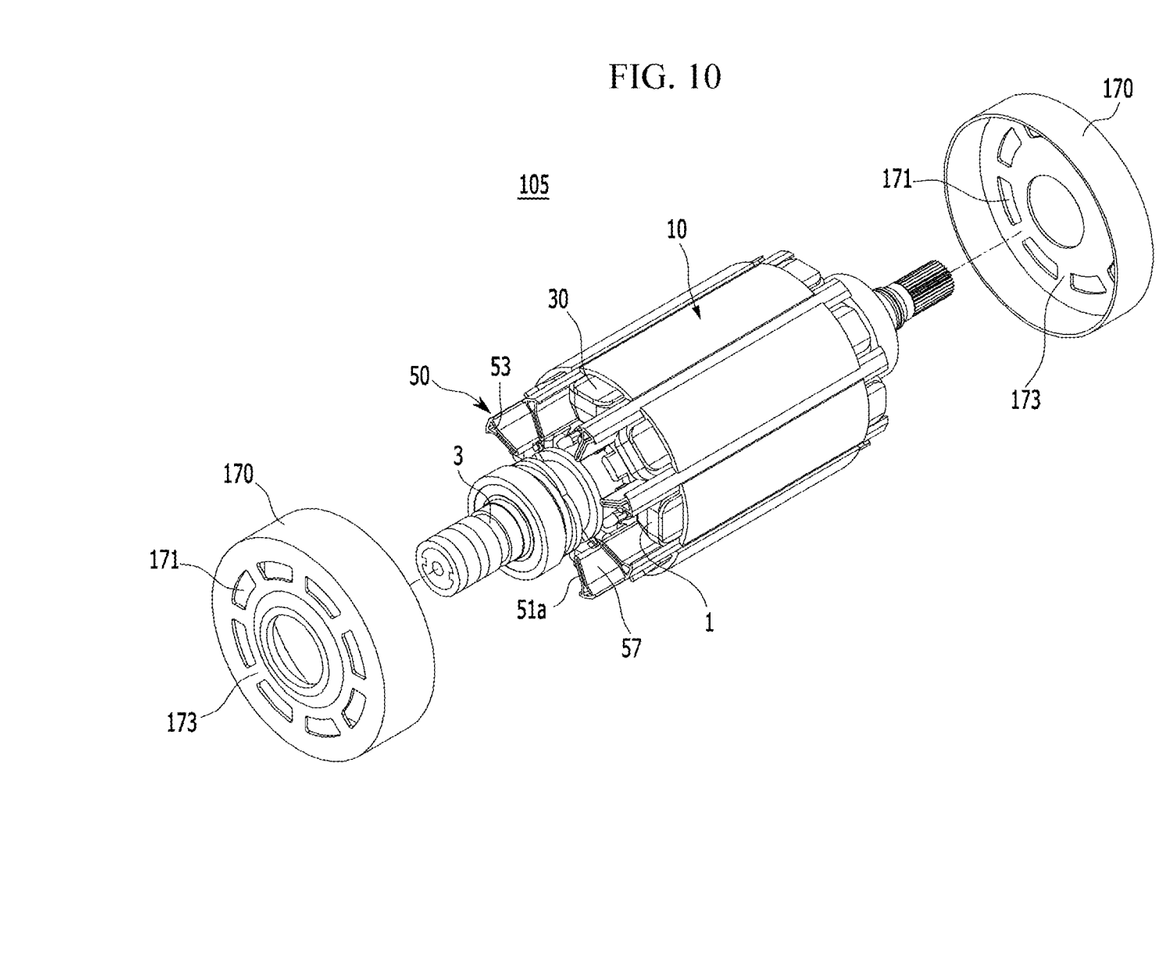
FIG. 10 is a partially exploded perspective view illustrating a rotor of a driving motor according to another exemplary embodiment of the present disclosure.

FIG. 9 is a perspective view illustrating a rotor of a driving motor according to another exemplary embodiment of the present disclosure. FIG. 9 is a partially exploded perspective view illustrating a rotor of a driving motor according to another exemplary embodiment of the present disclosure.

Referring to FIGS. 9 and 10, the driving motor according to another exemplary embodiment of the present disclosure has a non-molding type open structure that provides a rotor 105 that may efficiently emit heat generated from the rotor coil 1 through heat conduction characteristics of the wedge members 50. Because of the open structure, the flow of external air improves the efficiency and performance of a motor.

In another exemplary embodiment of the present disclosure, the rotor 105 may include the bobbin 30 having a plurality of first connection passages 33 extending in the axial direction of the rotor body 10 as illustrated in FIG. 5.

The first connection passages 33 are formed among the coil supports 31. As a result, the first connection passages 33 are radially partitioned and formed adjacent the center of the bobbin 30 by the coil supports 31. The coil supports 31 may support the rotor teeth 11 (hereinafter, see FIG. 6) and radially partition the plurality of first connection passages 33. Each first connection passage 33 comprises a hole extending in the axial direction of the rotor body 10 and connected with the slot 13 (hereinafter, see FIG. 6) between the rotor teeth 11.

Further, in another exemplary embodiment of the present disclosure, the driving motor may include the end coil cover 170 having second connection passages 171 for enabling external air flow to both sides of the rotor body 10.

The second connection passages 171 are radially formed and spaced apart about the center of the end coil cover 170. A plurality of ribs 173 is formed in the end coil cover 170 for radially partitioning the second connection passages 171.

The second connection passages 171 are connected with the first connection passages 33 of the bobbin 30. Further, the first and second connection passages 33 and 171 are connected with a space 17 between the rotor teeth 11 on which the rotor coil 1 is wound in the rotor body 10.

Meanwhile, both cross sections 51a of each wedge member 50 penetrate the first connection passages 33 of the bobbin 30 and are connected to the second connection passages 171 of the end coil cover 170. That is, both cross sections 51a of the wedge body 51 are connected to the exterior of the second connection passage 171 adjacent the ribs 173.

Herein, both cross sections 51a of the wedge body 51 are bonded to the exteriors of the second connection passages 171 by the welding method or by being forcibly fitted to the exteriors by the male-female method in the end coil cover 170 as described in the exemplary embodiment. In addition, the hollow area 53 defined in the wedge body 51 is connected with the second connection passage 171 of the end coil cover 170. As a result, the hollow area 53 may be connected to the second connection passage 171.

Meanwhile, the rotor 105 of the driving motor according to another exemplary embodiment of the present disclosure may have the non-molding type open structure adjacent the bobbin 30 and the end coil cover 170.

In order to support the centrifugal force applied to the rotor coil 1 and secure alignment of the rotor coil 1 when the rotor 105 rapidly rotates, the rotor 105 may be securely fix the rotor coil 1 through the bobbin 30 and the wedge member 50 without the need for molding a resin in the end coil cover 170.

In addition, in the rotor 105, the external air may flow to the rotor coil 1 of the rotor body 10 through the first connection passages 33 of the bobbin 30 and the second connection passages 171 of the end coil cover 170.

Hereinafter, an action of the driving motor according to another exemplary embodiment of the present disclosure will be described in detail with reference to the disclosed drawings.

First, when the current is applied to the stator coil of the stator 2 (hereinafter, see FIG. 1) and the rotor coil 1 of the rotor 105, the rotor body 10 rotates by a magnetic action generated between the stator 2 and the rotor body 10. In this case, copper loss by resistance of the rotor coil 1 occurs, and as a result, the heat is generated from the rotor coil 1.

With the first connection passages 33 formed in the bobbin 30 and the second connection passages 171 connected with the first connection passages 33 are formed in the end coil cover 170, the wedge members 50 are configured to protrude to the outside of the both ends of the rotor body 10. Thus, the air may flow to the rotor coil 1 of the rotor body 10.

The portions of the wedge members 50 that protrude may increase flowability of the air inside the end coil cover 170 and cause the air flow to the rotor coil 1 through the second connection passages 171 of the end coil cover 170 and the first connection passages 33 of the bobbin 30. In addition, the external air may flow in the axial direction of the rotor body 10 through the hollow areas 53 of the wedge members 50.

Furthermore, in another exemplary embodiment of the present disclosure, since each wedge member 50 is made of a metallic material having electrical conductivity and thermal conductivity and includes the wedge body 51 connected with the end coil cover 170, the wedge members 50 may easily transfer the heat to the end coil cover 170 through the wedge bodies 51.

Accordingly, the heat generated from the rotor coil 1 is emitted to the outside by the flow of the air and the heat may be easily transferred to the end coil cover 170 through the wedge members 50. Thus, the rotor coil 1 may be rapidly cooled.

As a result, since the heat generated from the rotor coil 1 may be efficiently emitted, the copper loss by the resistance of the rotor coil 1 may be reduced and the efficiency of the motor may be increased.

Further, the manufacturing cost may be reduced due to the elimination of the need for the molding resin and the cooling performance of the rotor 105 may be further increased by direct cooling of the rotor coil 1 by the external air.

Since the residual configurations and the residual action effects of the driving motor for the rotor 105 of the driving motor according to another exemplary embodiment of the present disclosure are the same as those of the above exemplary embodiment, more detailed description thereof will be omitted.

Although the exemplary embodiments of the present disclosure have been described as above, the technical spirit of the present disclosure is not limited to the exemplary embodiments presented in the present specification and those skilled in the art, who appreciate the technical spirit of the present disclosure will be able to easily propose other exemplary embodiments by addition, modification, deletion, annexation, and the like of components within the same scope of the technical spirit, but this is also included in the claims of the present disclosure.

What is claimed is:

1. A driving motor including a rotor body rotatably installed inside a stator with a predetermined void therebetween and having a rotor coil wound on multiple rotator teeth, the driving motor comprising:
multiple wedge members inserted between the rotor teeth of the rotor body in an axial direction of the rotor body and supporting the rotor coil; and
end coil covers mounted on axial ends of the rotor body, respectively and connected with the wedges,
wherein each wedge member includes a wedge body disposed between the rotor teeth in the axial direction and connected with the end coil covers, each wedge body having two ends,
each wedge body is made of a metallic material having conductivity and has an insulating layer formed on an outer surface other than both cross sections connected to the end coil covers, and
the end coil covers are made of a metallic material having conductivity and are connected with both ends of the wedge bodies.

2. The driving motor of claim 1, wherein:
the driving motor is driven as an induction motor by the wedge members and the end coil covers when the rotor malfunctions.

3. The driving motor of claim 2, wherein:
the wedge body of each wedge member is provided with a conductor bar inserted into the rotor body, and
the end coil cover is provided with an end ring connected with the wedge body.

4. The driving motor of claim 1, wherein:
both ends of each wedge body are bonded to the end coil covers.

5. The driving motor of claim 1, wherein:
both ends of each wedge body are coupled to the end coil covers by a male-female fitting.

6. The driving motor of claim 5, wherein:
both ends of each wedge body are coupled to fitting grooves provided in the end coil covers, and
the fitting grooves are formed with a fitting protrusion which protrudes from the end coil covers in a shape corresponding to a cross section of the wedge body.

7. The driving motor of claim 1, wherein:
each wedge body is made of from one of the following conductive metallic materials: iron, copper, and aluminum.

8. A method for controlling a driving motor of claim 1, which includes a stator on which a stator coil is wound and a rotor on which a rotor coil is wound and that spaced apart from the stator by a predetermined void, the method comprising:
applying current to the stator coil and the rotor coil;
diagnosing a malfunction of the rotor;
driving the driving motor as a wound rotor synchronous motor when it is determined that the rotor has not malfunctioned; and
blocking current applied to the rotor coil and driving the driving motor as an induction motor through a wedge member having conductivity in the rotor and end coil covers having the conductivity and connected with both ends of the wedge member, when it is determined that the rotor has malfunctioned.

9. The method of claim 8, wherein:
when diagnosing a malfunction of the rotor, a short-circuit and an insulation defect of the rotor coil are sensed.

10. A driving motor including a rotor body rotatably installed inside a stator with a predetermined void therebetween and having a rotor coil wound on multiple rotator teeth, the rotor body having two axial ends, the driving motor comprising:
a bobbin disposed at each axial ends of the rotor body, supporting the rotor coil, and fixed to the rotor body by the rotor coil;
multiple wedge members which are inserted between the rotor teeth of the rotor body in an axial direction of the rotor body, protruding to the outside of both ends of the rotor body, and supporting the rotor coil; and
end coil covers mounted on both axial ends of the rotor body, connected with a protruding portion of each wedge member, and mounted on the bobbins, respectively,
wherein the wedge member includes a wedge body disposed between the rotor teeth in the axial direction and connected with the end coil covers,
each wedge body being made of a metallic material having conductivity and having an insulating layer formed on an outer surface other than both cross sections connected to the end coil covers,
the bobbin having a plurality of first connection passages opened in the axial direction of the rotor body, and
the end coil covers being made of a metallic material having conductivity and having at least one second connection passage connected with the first connection passage.

11. The driving motor of claim 10, wherein:
the rotor having an open structure by the bobbin and the end coil covers.

12. The driving motor of claim 10, wherein:
the first and second connection passages are connected with a space between the rotor teeth on which the rotor coil is wound in the rotor body.

13. The driving motor of claim 10, wherein:
the bobbin includes a plurality of coil supports supporting the rotor teeth and radially partitioning the plurality of first connection passages.

14. The driving motor of claim 13, wherein:
each end coil cover includes a plurality of ribs radially partitioning the second connection passages.

15. The driving motor of claim 14, wherein:
the protruding portion of each wedge member penetrates the first connection passages of the bobbin and is connected to the second connection passages of each end coil cover.

16. The driving motor of claim 15, wherein:
each wedge body includes a hollow area formed in the axial direction of the rotor body, and
both ends of each wedge body are connected to an exterior of the second connection passages among the ribs.

17. The driving motor of claim 16, wherein:
the second connection passages are connected with the hollow area of each wedge body.

* * * * *